United States Patent [19]

Johnston

[11] Patent Number: 5,017,653

[45] Date of Patent: May 21, 1991

[54] LOW NERVE, LOW TEMPERATURE EXPANDABLE, CURABLE HOT MELT SEALANT

[75] Inventor: Thomas K. Johnston, Brentwood, Mo.

[73] Assignee: United Technologies Automotive Inc., Dearborn, Mich.

[21] Appl. No.: 464,575

[22] Filed: Jan. 16, 1990

Related U.S. Application Data

[63] Continuation of Ser. No. 142,179, Jan. 11, 1988, abandoned.

[51] Int. Cl.$^5$ .......................... C08L 9/06; C08L 51/02
[52] U.S. Cl. ........................................ 525/89; 525/98; 525/99
[58] Field of Search .............................. 525/89, 99, 98

[56] References Cited

U.S. PATENT DOCUMENTS

| | | | |
|---|---|---|---|
| 3,933,724 | 1/1976 | Mixell | 260/33.6 A |
| 4,120,923 | 10/1978 | Kloker et al. | 264/45.3 |
| 4,172,862 | 10/1979 | Maximovich et al. | 525/96 |
| 4,256,850 | 3/1981 | Thorsrud | 521/139 |
| 4,360,120 | 11/1982 | Samuel et al. | 524/494 |
| 4,386,187 | 5/1983 | Grancio et al. | 525/96 |
| 4,680,316 | 7/1987 | Douglas | 521/89 |
| 4,693,772 | 9/1987 | Douglas | 156/79 |
| 4,699,938 | 10/1987 | Minamizaki et al. | 525/89 |

FOREIGN PATENT DOCUMENTS

| | | | |
|---|---|---|---|
| 0211466 | 2/1987 | European Pat. Off. | 525/89 |
| 0238135 | 9/1987 | European Pat. Off. | 525/89 |
| 62-70475 | 3/1987 | Japan | 535/89 |

*Primary Examiner*—Allan M. Lieberman

[57] ABSTRACT

The present invention discloses a hot melt sealant comprising a thermosetting styrene butadiene diblock copolymer and a styrene butadiene terpolymer. The composition being capable of flowing, expanding and curing at temperatures below 300° F. Also disclosed is a method of making the sealant and a method of using the sealant.

11 Claims, No Drawings

LOW NERVE, LOW TEMPERATURE EXPANDABLE, CURABLE HOT MELT SEALANT

This is a continuing application of Ser. No. 07/142,179, filed Jan. 11, 1988 now abandoned.

TECHNICAL FIELD

The technical field to which this invention pertains is sealants and adhesives and in particular to hot melt sealants which expand and flow upon heating.

BACKGROUND OF THE INVENTION

Expandable sealants have been known and used for some years. Basically, these sealants are prepared in two forms. The first form is commonly referred to as "pumpable sealants" in which the composition is in the form of a mastic or paste. These sealants can be heated to reduce their viscosity so that it may then be possible to pump the sealant through a line to the desired location. The sealant is then heated to a sufficiently high temperature causing it to expand and cure and since they are pumped into place they are not required to flow during the expansion and curing cycle.

Additionally, these materials do not have to be extrudable nor do they have to possess any "green strength" since they are not intended to be handled but only pumped into position. In the past such materials have been formulated from any number of polymers some of which contained styrene-butadiene diblock copolymers, and terpolymers mixed with polyvinyl chlorides and other rubber materials.

The second type of sealants, and the ones to which this invention is directed, are known as "hot melt" sealants. These sealants are characterized in that unlike the pumpable materials, these have good "green strength" and are capable of being formed into shapes, typically by extrusion, so that they might easily be placed in a preliminary position and then when heated the sealant would flow into the desired position, expand and cure. Again these materials have been formulated using styrene butadiene diblock copolymers and styrene butadiene divinylbenzene terpolymers, among other polymers.

One of the more common uses for the hot melt sealants have been in the automobile industry to seal or fill in gaps between mating pieces of the automobile. For instance these sealants are used in the area where the windshield meets the frame of the car where the fit may not be perfect and will result in a gap which may permit dust, dirt, noise or other material to enter through this gap or it may form a trough where water may collect and eventually cause rust to develop.

Both of these sealant types have in the past been manufactured to respond (expand, cure or flow) at temperatures in excess of 300° F. The reason for this is that these sealants are applied to the car prior to their being passed through the paint bake cycle in the factory which until recently has been operated at temperatures in excess of 300° F., typically temperatures of about 325° F. to 350° F.

However, due to the high cost of energy and the increased emphasis on construction there has been a big push in the automobile industry to reduce the operating temperatures of the paint ovens and consequently the operative temperatures of these sealants. Currently the manufacturers intend to operate these ovens in the temperature range below 300° F., and ideally at temperatures in the range of 225° F. to 275° F., up to nearly 100° F. below the current levels. This is going to necessitate the modification or alteration of these different sealants so that they will be useful at these lower temperatures.

This lowering of the reaction temperature of these complicated sealants is not a simple matter. Contained in the sealant is a blowing agent to cause the sealant to expand, a curing agent to cause the sealant to cure and additionally the sealant must flow properly during the heating cycle to seal effectively. All of these three reactions happening simultaneously to one extent or another during the bake cycle. Therefore, a balance between the rapidity of the flow or the thinning out of the sealant, and the expansion as well as the timing of the cure are important for the sealant to operate properly. A sealant that flows to rapidly will not have the required body to capture the blow and expand, while the cure can not be too rapid or it will reduce the flow of the sealant and could impair the expansion of the sealant due to the increase in viscosity.

Therefore what is needed in this art is a new hot melt sealant which will flow, expand and cure at temperatures below the current operating temperatures of 325° F. to 350° F.

DISCLOSURE OF THE INVENTION

The present invention is for a hot melt sealant which will flow, expand and cure in the expanded state at a temperature below 300° F.

Also disclosed is a hot melt sealant which is capable of flowing, expanding and curing at temperatures below 300° F. comprising a mixture of a low molecular weight styrene-butadiene diblock copolymer, a high molecular weight styrene-butadiene cross-linkable terpolymer.

Also disclosed is a method of making the expandable sealant which will follow, expand and cure in the expanded state at temperatures below 300° F.

Also disclosed is a method for applying the expandable sealant of the present invention to a substrate and expanding, flowing and curing it.

The foregoing and other features and advantages of the present invention will become more apparent from the following description.

BEST MODE FOR CARRYING OUT THE INVENTION

The present invention discloses a hot melt sealing which is capable of flowing, expanding and curing at temperatures below 300° F. This sealant is formed of one or more polymeric materials which contain blowing agents to cause the sealant to expand at the desired temperature as well as curing agents which will cure or thermally set the sealant at the desired temperature. These sealants should exhibit good "green strength" to allow ease of handling and typically are capable of being extruded or formed into specific shapes (i.e. rods, sheets etc) by conventional means. Additionally the sealant should be capable of expanding to about 15 percent to about 45 percent its original volume at temperatures below 300° F. and will also be capable of flowing from about 8 times to about 28 times its original cross sectional area with about 12 times to about 24 times being preferred.

Generally the sealant will comprise a mixture of three or more polymers. The first polymer will be a low molecular weight material which will be capable of flowing at the low temperatures at which these sealants will be used. The preferred low molecular weight polymer is a styrene-butadiene diblock copolymer which will flow relatively freely at temperatures above 200° F. but will be compatible with the other polymers and ingredients used in the sealant. Typically styrene-butadiene diblock copolymers having number average molecular weights ranging below 150,000 will be useful with those having molecular weights between 80,000 and 150,000 being preferred. Solprene 1205 (which is available from Industria Negromex Corporation distributed by Housmex, Inc., Akron, Ohio) is the preferred material. It has a molecular weight of abut 83,000 and is a solution polymerization, diblock copolymer of styrene-butadiene having a ratio of styrene to butadiene of 25 to 75.

The second constituent is a high molecular weight styrene butadiene emulsion terpolymer which will cure at the desired temperature (below 300° F.). The preferred material is a high molecular weight hot emulsion polymerized styrene-butadiene divinylbenzene terpolymer. The number average molecular weight range of such polymers should be in excess of 250,000 and will generally range between 250,000 and 450,000. The terpolymer will typically have about 23 percent to about 45 percent bound styrene.

These high molecular weight polymers have high viscosities and assist in catching the blow as the sealant expands. Additionally, these materials are capable of cross linking or curing sot hat once the sealant has been expanded the sealant will cure and remain in the expanded state.

Preferably these high molecular weight materials will be the result of emulsion polymerization of styrene-butadiene-divinyl benzene terpolymer such as SBR 1009 available from Ameripol Synpol Company or SBR 4503 available from B. F. Goodrich. These materials are fast curing so that they will cure quickly at the lower operating temperatures and trap the blow. Typically these materials will be present in amounts ranging from 5 pph (parts per hundred by weight) to about 30 pph of the polymer system (the polymer system comprising the three polymer components the styrene butadiene diblock copolymer, the terpolymer and the triblock copolymer). Another styrene butadiene terpolymers which may be useful is SBR 1018 which is also a styrene-butadiene-divinylbenzene terpolymer.

It must be kept in mind and would be known to one skilled in the art that the selection of a particular polymer must be consistent with the requirements of the final sealant. In other words the constituents, including the blowing and curing agents etc., must not interact so as to interfere with any of the activities taking place during curing. For instance one would want to have a cross-linking polymer which does not cure so rapidly at the temperature that it would increase the viscosity so much prior to full expansion that the sealant does not expand properly. However, the polymer must set enough so that the gases causing the expansion are not allowed to escape. Additionally the amount of each constituent will be important in the final produce and will vary with an individual formulation but will be discernible through simple experimentation.

In order to give the sealant sufficient "green strength" and elasticity a third polymer constituent is added. These materials are solution polymerized triblock copolymers of styrene and butadiene. The preferred materials are those known commercially as Kratons ®. These materials are available from Shell Corporation as a Kraton ® 1101, 1102, 1107, or from Japan Elastomer Company as Solprene 414 or from Firestone Rubber Company as Stereon 840A. These materials are styrene-butadiene-styrene triblock copolymers or styrene-isoprene-styrene triblock copolymers. These materials will generally be present in concentrations from about 5 pph to about 50 pph of the polymer system. Preferably they will be present at concentrations from about 20 pph to about 40 pph.

Other resins or polymers may be added to improve certain physical properties desirable in a specific sealant design for example to extend the polymer system or to improve the adhesion and general compatibility of the system. These materials must be compatible with the primary polymer constituents (for example they must not separate from the sealant, interfere with the curing, flowing or expansion of the sealant etc). Some typical materials may be alpha-methyl styrene, ethylene vinyl acetate copolymer etc. Typically these will be present in quantities ranging from about 0 percent of the formula weight to about 40 percent of the formula weight.

In addition to the polymeric components a blowing agent and a curing agent will be necessary. The blowing agent may be any conventional blowing agent generally used in the manufacture of expandable rubber compounds and which will activate or may be caused to activate at temperatures below 300° F. or lower depending on the desired activation temperature of the sealant. A representative list of some of the more common ones are set forth in Table 1 below.

TABLE 1

$p=p'$-oxybis-(benzenesulfonyl hydrazide)
p-toluene sulfonyl hydrazide

Blowing agents of the oxybis-(benzenesulfonyl hydrazide) type are available as Celogen OT from the UniRoyal Chemical Company of Naugatuck, Conn. or OBSH available from Harwick Chemical Company Akron, Ohio, while the toluene sulfonyl hydrazide is available from Uniroyal Chemical as Celogen TSH or from Olin Corporation, Stamford, Conn. as a RIATM-CS.

Also present will be curing agents to cure the cross-linkable polymeric constituent. Again these materials are well known to those skilled in the art and a representative listing of some of the more common ones are set forth in Table 2 below. These materials may be present in concentrations which will vary with the amount of curable polymer present and the desired speed at which the polymer must be cured. As a general rule they will be present in amounts ranging from about 2 pph to about 20 pph of the polymer system. With the preferred concentration being from about 5 pph to about 15 pph of the polymer system.

TABLE 2

1. zinc salt of 2-mercaptobenzothiazole
2. N-oxydiethylene-2-benzothiazole-sulfonamide
3. N-t-butylbenzothiazole-2-sulfonamide
4. N-Cyclohexylbenzothiazole-2-sulfonamide
5. tetramethylthiuram monosulfide Materials comprising the first curing agent in the Table are commercially available from Vanderbilt R. T. & Co. of Norwalk, Conn. as Zetax or from UniRoyal Chemical Company as OXAF or from American Cyanamid of Perl River, N.Y. as ZMBT. While materials numbered 2–4 of the table are available from Monsanto Industrial Chemical, St. Louis, Mo. as Santocure MOR, American Cyanamid as NOBS special and Pennwalt, Buffalo, N.Y. as Pennac MBS.

Both the curing agent and the blowing agent must be such that they will be activated at the desirable temperature (the bake temperature of the paint ovens below 300° F.) either innately or with the aid of an activator which will reduce the temperature at which they start blowing or curing. Such activators would be known by those skilled in the art. Some of the more familiar activators useful with these materials would be zinc oxide and stearic acid.

Other materials may be added to customize or prepare a sealant having certain desirable properties. For instance it may be desirable to add an epoxy material to aid in bonding the sealant to a substrate or to improve its hardness after cure. These materials may be added in amounts which do not interfere with the flow, blow or cure of the base sealant and will generally be present in amounts ranging from about 0 percent of formula weight to about 5 percent of formula weight of the sealant composition. These epoxy materials may be derived from bis-phenol A or a Novolac resin and may be cured using conventional curing agents in the appropriate amounts which would be known to those skilled in the art.

Other materials which may be added are the traditional materials used to prepare the noncross-linkable sealants of the prior art such as fillers, fire retardants, pigments etc. All should be present in amounts which do not interfere with the properties of the base sealant. Typically this will be the same concentrations as the prior art sealants.

As a general formulation the following may be used to develop sealants of the present invention:

|  | PERCENT OF FORMULA WEIGHT |
|---|---|
| Styrene butadiene diblock copolymer | 4–20 |
| Styrene butadiene terpolymer | 1–10 |
| Styrene butadiene triblock copolymer | 0–10 |
| Extender materials | 0–20 |
| Epoxy | 0–5 |
| styrene (resin) | 0–20 |
| pigment | 0–2 |
| filler | 0–50 |
| oils | 0–20 |
| blowing agents | .2–1 |
| curing agent | 1–4 |

The sealant may be prepared using conventional processing for the manufacture of polymeric sealants. Typically the polymers are weighed out and then mixed together using a Banburry or Baker-Perkins mixer until homogeneous. Then the other constituents are added such as plasticizers, fillers, pigments, blowing and curing agents and activators if necessary. The entire composition is then mixed thoroughly to substantially uniformly distribute all of the ingredients throughout the sealant. It should be kept in mind that the temperature of the sealant composition during this process should not exceed the activation temperature of the curing action or the blowing action as this will cause the sealant to expand and/or cure prematurely.

After the sealant composition has been mixed it may be formed into any number of shapes for which its "green strength" is adequate to maintain. Preferably these materials are extruded using conventional extrusion techniques (bearing in mind that the temperature of the hopper and extrusion process should not exceed the activation temperature of the blowing agents or curing agents). One conventional shape will be a thin rod or bead ranging in diameter from about 3 millimeters to about 8 millimeters. Naturally other diameters could be made if desirable and this invention should not be considered limited to this particular shape or size.

Examples of two sealant formulations and their resulting properties are shown in the examples below.

EXAMPLE 1

A sealant composition of the present invention was prepared having a "low flow" as follows:

| | | |
|---|---|---|
| Ameripol 1009 (terpolymer) | 4.41 | Ameripol/Synpol Company |
| Krayton ® 1102 (triblock copolymer) | 8.83 | Shell Chemical Company |
| SBR 1205 (diblock copolymer) | 11.04 | Industria Negromex Corp. |
| Elvax 150 (ethylene/vinylacetate/ copolymer) | 11.04 | DuPont |
| DEN-485 (epoxy novolac) | 1.59 | Dow Chemical |
| Piccotex 100 (α-methyl styrene vinyl toluene) | 11.04 | Hercules |
| Stearic Acid | 0.35 | |
| Iron Oxide | 1.67 | |
| Hubercarb 200 (limestone) | 26.6 | J. M. Huber Corp. |
| Di isodecyl phthalate | 5.52 | |
| Sunthene 410 | 11.42 | Sun Oil Co. |
| Zinc Oxide | 2.21 | |
| Celogen OT (p,p'-oxybis-benzene-sulfonyl hydrazide) | 0.53 | UniRoyal |
| Sulfur | 0.66 | |
| Zetex (Zn/2-mercaptobenzothiazole) | 2.65 | R. T. Vanderbilt Company |
| BSH (Benzene Sulfonyl Hydrazide) | .31 | Harwick Chemical Company |
| Modified Urea | 0.22 | Olin Corporation |

All weights are parts per hundred basis.

All of the copoylmers and terpolymers and the ethylene/vinylacetate were placed in the Baker Perkins mixer and heated to 300° F. and mixed for 30 minutes. Then about half of the oil and all of the limestone, pigment and stearic acid were added and the entire mixture was mixed until smooth while maintaining the temperature at about 270° F. to about 310° F. The mixture was then cooled to below 140° F. and the rest of the ingredients were added and the mixture was then mixed at temperature until homogeneous. The material was then removed from the mixer and cut into small pieces and allowed to cool to about 90° F.

The sealant was then placed in an extruder hopper at a temperature of about 100° F. to about 110° F. and extruded through a die to form a rod having a cross sectional area of 6 millimeters.

The rod was then affixed to a vertical plate and heated to 240° F. for 25 minutes. The sealant flowed to 12.6 times its cross-sectional area, and expanded to 30 percent of its original volume.

EXAMPLE 2

A high flow sealant was prepared as follows:

| | | |
|---|---|---|
| Ameripol 1009 (terpolymer) | 4.41 | Ameripol/Synpol Company |
| Krayton ® 1102 copolymer) | 8.83 | Shell Chemical Company |

-continued

| | | |
|---|---|---|
| SBR 1205 (diblock copolymer) | 10.39 | Industria Negromex Corp. |
| Elvax 150 (ethylene/vinylacetate/ copolymer) | 10.39 | DuPont |
| DEN-485 (epoxy novolac) | 1.50 | Dow Chemical |
| Piccotex 100 (α-methyl styrene vinyl toluene) | 15.59 | Hercules |
| Stearic Acid | 0.33 | |
| Iron Oxide | 1.58 | |
| Hubercarb 200 (limestone) | 24.94 | J. M. Huber Corp. |
| Di isodecyl phthalate | 7.27 | |
| Sunthene 410 | 19.35 | Sun Oil Co. |
| Zinc Oxide | 2.08 | |
| Celogen OT (p,p'-oxybis-benzene-sulfonyl hydrazide) | 0.50 | UniRoyal |
| Sulfur | 0.62 | |
| Zetex (Zn/2-mercaptobenzothiazole) | 2.49 | R. T. Vanderbilt Company |
| BSH (Benzene Sulfonyl Hydrazide) | .29 | Harwick Chemical Company |
| Modified Urea | 0.21 | Olin Corporation |

All weights are parts per hundred basis.

As in example 1, the components were added to the Baker Perkins mixer for the same amount of time and at the same temperature. They were then extruded in the same manner and tested as before. The results of this sealant showed that the sealant had substantially higher flow properties, 21 times the cross-sectional area of the sample while maintaining good expansion properties 27 percent of the original volume.

These sealants are unique in that they are capable of performing three different activities, they can flow readily, expand and cure at a low temperature thereby making them useful in areas where before the temperatures were considerably higher. This will allow the automobile manufacturers and others using such materials to reduce there energy costs considerably.

Although the invention has been shown and described with respect to detailed embodiments thereof, it will be understood by those skilled in the are that various changes in form and detail thereof may be made without departing from the spirit and scope of the invention.

I claim:

1. A hot melt sealant comprising a thermosetting polymeric material of a mixture of a styrene butadiene diblock copolymer having a molecular weight below 150,000, a cross-linkable styrene butadiene terpolymer having a molecular weight greater than 250,000 and a styrene butadiene triblock copolymer and also containing an effective amount of a blowing and curing agent, wherein said constituents of the thermosetting material are present in sufficient proportions and quantities to form a hot melt sealant which is capable of flowing, expanding and curing at temperatures below 300° F.

2. The sealant of claim 1 wherein the cross-linkable styrene butadiene terpolymer is present in amounts of about 5 pph to about 30 pph, the styrene butadiene triblock copolymer is present in amounts of about 5 pph to about 50 pph with the balance being the styrene butadiene diblock copolymer.

3. The sealant of claim 2 wherein the styrene butadiene diblock copolymer has an average molecular weight of about 80,000 to about 150,000 and the cross-linkable styrene butadiene terpolymer has an average molecular weight of about 250,000 to about 450,000.

4. The sealant of claim 2 wherein the terpolymer is a styrene butadiene divinylbenzene.

5. The sealant of claim 2 wherein the triblock copolymer is either a styrene butadiene styrene triblock copolymer or a styrene isoprene styrene triblock copolymer.

6. A hot melt sealant of claim 2 wherein the sealant is capable of flowing at least 8 times its cross-sectional area and expanding at least 15 percent of its original volume and capable of curing in the expanded state at temperatures below 300° F.

7. The composition of claim 2 wherein the sealant further contains an ethylene vinyl acetate copolymer.

8. A hot melt sealant comprising a thermosetting polymeric material of a mixture of a styrene butadiene diblock copolymer having a molecular weight below 150,000, a cross-linkable styrene butadiene terpolymer having a molecular weight greater than 250,000 and a styrene isoprene triblock copolymer and also containing an effective amount of a blowing and curing agent, wherein said constituents of the thermosetting material are present in sufficient proportions and quantities to form a hot melt sealant which is capable of flowing, expanding and curing at temperatures below 300° F.

9. A method of making a sealant which flows, expands, and cures in the expanded state at temperatures below 300° F. comprising:
   mixing a styrene butadiene diblock copolymer having a molecular weight below 150,000, a cross-linkable styrene butadiene terpolymer having a molecular weight greater than 250,000 and a styrene butadiene triblock copolymer, in sufficient proportions and quantities, with an effective amount of a blowing agent and curing agent such that the sealant is capable of flowing, expanding and curing at temperatures below 300° F.,
   forming the sealant into desired shapes at temperatures below the activation temperature of the blowing agents and curing agents.

10. The method of claim 9 wherein the polymers are mixed together at temperatures of about 300° F.; and the polymeric mixture of the first step is then cooled to temperatures below about 140° F. and the blowing and curing agents are added to the polymers and mixed until homogeneous to form the sealant; then forming the sealant into the desired shape.

11. The method of claim 9 wherein the sealant comprise a mixture of a low molecular weight styrene butadiene diblock copolymer, a high molecular weight styrene butadiene terpolymer and a solution polymerization triblock copolymer.

* * * * *